US008684553B2

(12) United States Patent
Chen

(10) Patent No.: US 8,684,553 B2
(45) Date of Patent: Apr. 1, 2014

(54) OUTDOOR SOLAR LIGHT WITH MULTI-PANEL SOLAR ARRAY

(75) Inventor: Chi Gon Chen, Guang Zhou (CN)

(73) Assignee: International Development LLC, Roanoke, TX (US)

( * ) Notice: Subject to any disclaimer, the term of this patent is extended or adjusted under 35 U.S.C. 154(b) by 215 days.

(21) Appl. No.: 13/165,610

(22) Filed: Jun. 21, 2011

(65) Prior Publication Data

US 2012/0327639 A1     Dec. 27, 2012

(51) Int. Cl.
*F21L 13/00* (2006.01)
(52) U.S. Cl.
USPC .................. 362/183; 362/159; 362/197
(58) Field of Classification Search
USPC ......... 362/183, 157, 159, 187, 194, 197, 277, 362/282
See application file for complete search history.

(56) References Cited

U.S. PATENT DOCUMENTS

2007/0242451 A1   10/2007   Richmond
2008/0037243 A1    2/2008   Discoe et al.

*Primary Examiner* — Vip Patel
(74) *Attorney, Agent, or Firm* — Brian Harris

(57) ABSTRACT

A solar powered lighting fixture having a multi-paneled solar array that maximizes the generation of solar energy during the course of a day. The outdoor lighting fixture of the present invention includes a multi-paneled solar array housing positioned on an extension rod that includes a plurality of solar panels arranged in a slanted configuration about the periphery of the housing unit. The housing unit is positioned on the extension rod so as to be elevated above the ground but below the actual light fixture. Employing a housing unit separate from the light fixture permits a greater variety of shapes to be used for the light fixture. Moreover, it allows the individual solar panels to be positioned at an optimal angle for maximizing exposure to solar radiation. Each of the solar panels is independent of the others, charging the battery separately so as not interfere with the other solar panels.

8 Claims, 5 Drawing Sheets

OUTDOOR SOLAR LIGHT WITH MULTI-PANEL SOLAR ARRAY

BACKGROUND OF THE INVENTION

1. Technical Field of the Invention

The present invention pertains to solar powered light systems such as those used primarily in close proximity to residences for the purpose of illuminating walkways or providing decorative lighting; more particularly the present invention pertains to a system for enhancing the collection of solar energy to power solar powered outdoor lights.

2. Description of the Related Art

In the past several years, the technology associated with solar panels and light emitting diodes has seen rapid development. Specifically, while solar panels were once almost a novelty item or an item used only in remote locations, both the cost of solar panels has decreased and the output of electrical energy from solar panels has increased. Similarly, while light emitting diodes had only limited applications for many years, both the cost of light emitting diodes has decreased and the output of light energy has increased. Accordingly, the power available from solar panels has grown to a level where the power requirements for a light emitting diode having an acceptable light output level for use in an outdoor setting can now be met with a solar panel. Similarly, the cost of both solar panels and light emitting diodes have both decreased to the point where an outdoor light fixture using electrical energy obtained from solar panels and emitting light from light emitting diodes is affordable to most homeowners.

The convergence of the development of the technology associated with solar panels and the technology associated with light emitting diodes has created a market where small outdoor lighting fixtures used to mark walkways or to enhance the appearance of landscaping are now in demand by homeowners. These small outdoor lighting fixtures include solar panels to capture light energy and then turn the light energy into electrical energy. The electrical energy is then stored in a battery and then directed, when needed, to an array of light emitting diodes which illuminate on receipt of the electrical energy obtained from the battery.

Early outdoor lighting fixtures typically featured a string of outdoor light fixtures connected to a common solar panel, which provided electrical power for energizing the light emitting diodes. More recently, individual outdoor light fixtures having integral solar panels have been created. For example, a prior art outdoor light fixture 10 is depicted in FIG. 1 comprising a extension rod 20 having a spike 22 on one end, a light element 40 on an opposing end and a disc-shaped housing 30 configured therebetween that supplies electrical energy to the light element 40. The disc-shaped housing 30 includes a flat solar panel array 32 configured on the top planar surface 34 of the housing 30. The housing 30 is typically affixed to the extension rod 20 so that when the spike 22 is inserted into the ground, the solar panel array 32 with be substantially parallel with the earth so as to face upwards towards the open sky. Another common variant (not shown) features the housing affixed to the extention rod by means of a hinge mechanism so that the housing (and consequently the solar array) may be tilted in a variety of fixed configurations. While such outdoor lighting fixtures are satisfactory in many instances, they are inherently suseptible to poor recharging characteristics because the natural movement of the sun inherently insures that the solar array is positioned optimally to receive the sun light for only a portion of the day. Accordingly, a need remains in the art of solar powered outdoor lighting fixtures to provide a system by which the solar array is positioned more optimally so as to receive the maximum amount of available sunlight throughout the day.

SUMMARY OF THE INVENTION

The outdoor lighting fixture of the present invention provides a solar powered lighting fixture having a multi-paneled solar array that maximizes the generation of solar energy during the course of a day. More specifically, the outdoor lighting fixture of the present invention includes a multi-paneled solar array housing positioned on an extension rod that includes a plurality of solar panels arranged in a slanted configuration about the periphery of the housing unit. The housing unit is positioned on an extension rod so as to be elevated above the ground but below the actual light fixture. Employing a housing unit separate from the light fixture permits a greater variety of shapes to be used for the light fixture. Moreover, it allows the individual solar panels to be positioned at an optimal angle for maximizing exposure to solar radiation. Each of the solar panels is independent of the others, charging the battery separately so as not interfere with the other solar panels. In a preferred embodiment, multiple pairs of solar panels are arranged on opposing sides of the housing unit.

By including a multi-paneled solar array on the outdoor lighting fixture of the present invention, the exposure to, and hence the generation of, solar energy is maximized during the course of a day. That is, by positioning a multi-paneled solar array housing on an extension rod in accordance with the present invention, one or more of the individual solar panels is optimally positioned for receiving solar energy. Thus, with this added functionality, the outdoor lighting fixture of the present invention is better able to recharge its batteries during daylight hours.

BRIEF DESCRIPTION OF THE DRAWINGS

A more complete understanding of the method and apparatus of the present invention may be had by reference to the following detailed description when taken in conjunction with the accompanying drawings, wherein.

Figure 1:
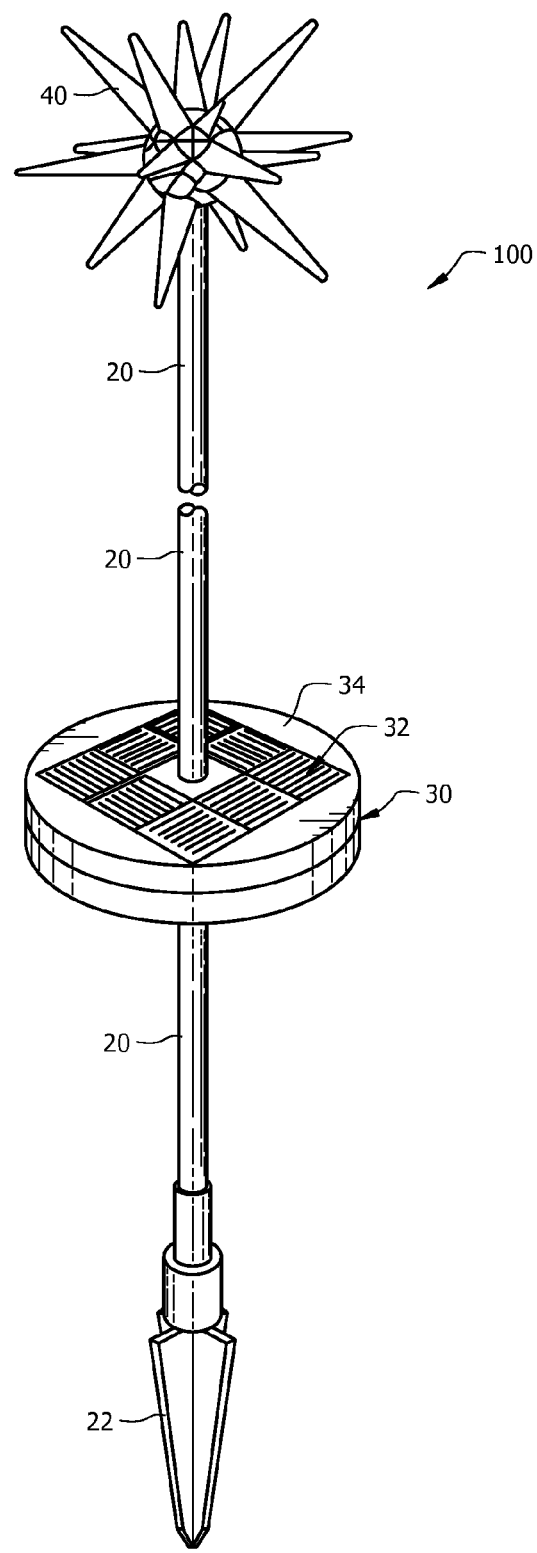
FIG. 1 is a perspective view of a prior art embodiment of an outdoor light.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2A:
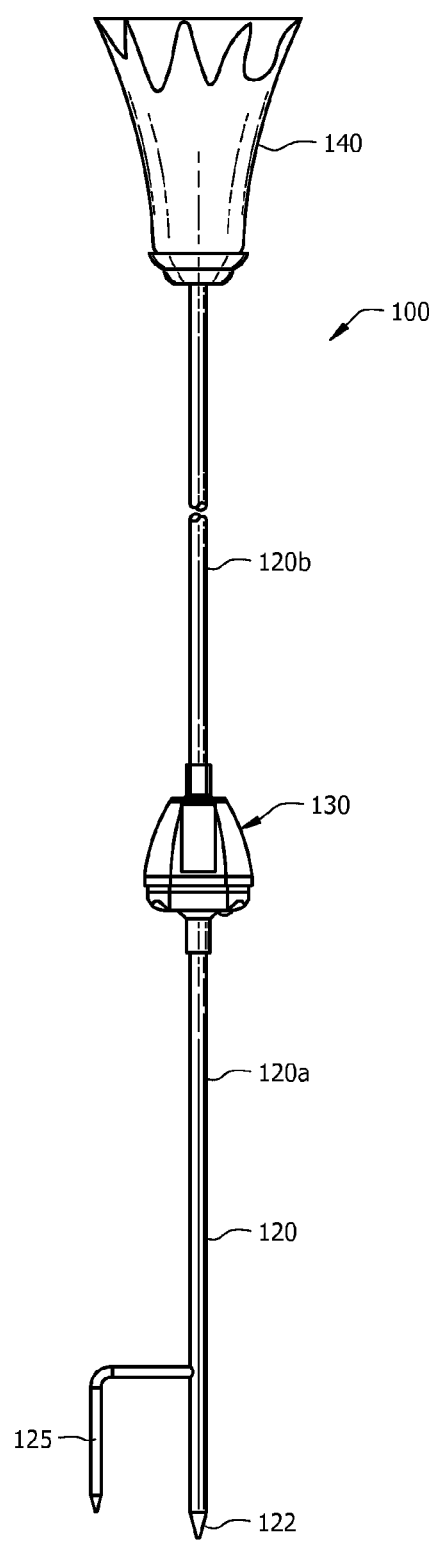
FIG. 2A is a perspective view of a first embodiment of the outdoor light of the present invention.
Figure 2B:
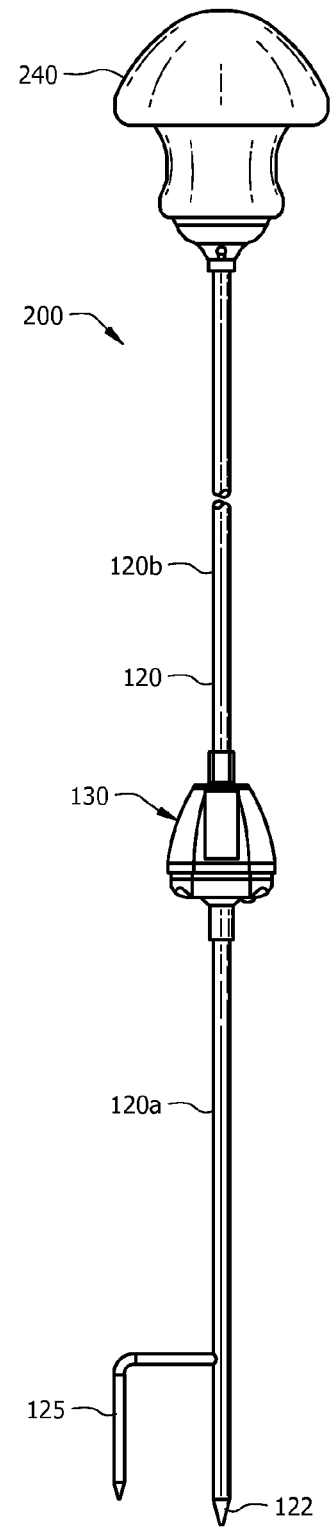
FIG. 2B is a perspective view of a second embodiment of the outdoor light of the present invention.

Preferred embodiments of the outdoor light fixture of the present invention are depicted in FIGS. 2A and 2B. Both embodiments include an extension shaft 120 having a ground spike 122 on one end and a light fixture element on the opposing end with a multi-panel solar array 130 configured therebetween. The extension shaft 120 includes a lower portion or section 120a configured below the multi-panel solar array housing 130 and an upper portion or section 120b configured above the multi-panel solar array housing 130. While the lower portion or section 120a of the extension shaft 120 may be of either solid or hollow construction, upper portion or section 120b must be hollow in order to for a conduit for electrically connecting the multi-panel solar array 130 to the light fixture element. The lower portion of the extension shaft 120 may further include a stabilization spike 125 configured parallel to and offset from the extension shaft 120.

The extension shaft 120 may comprise a single piece unit extending through the multi-panel solar array housing 130 or, preferably as shown, a two-piece unit comprising a lower and upper extension shafts 120a, 120b. For example, as shown in the Figures, the lower extension shaft 120a includes a ground spike 122 on one end and a distal end 126 that engages a complementary receiver mount 139 configured on the bottom of the lower housing portion 134 of the multi-panel solar array 130. The upper extension shaft 120b includes one end engaged in a complementary receiver mount 137 configured on the top of the upper housing portion 132 of the multi-panel solar array 130. The hollow upper extension shaft 120b provides a protective conduit for an electrical connection (e.g., wires) (not shown) between the multi-panel solar array 130 and the light fixture element.

Figures 3A, 3B:
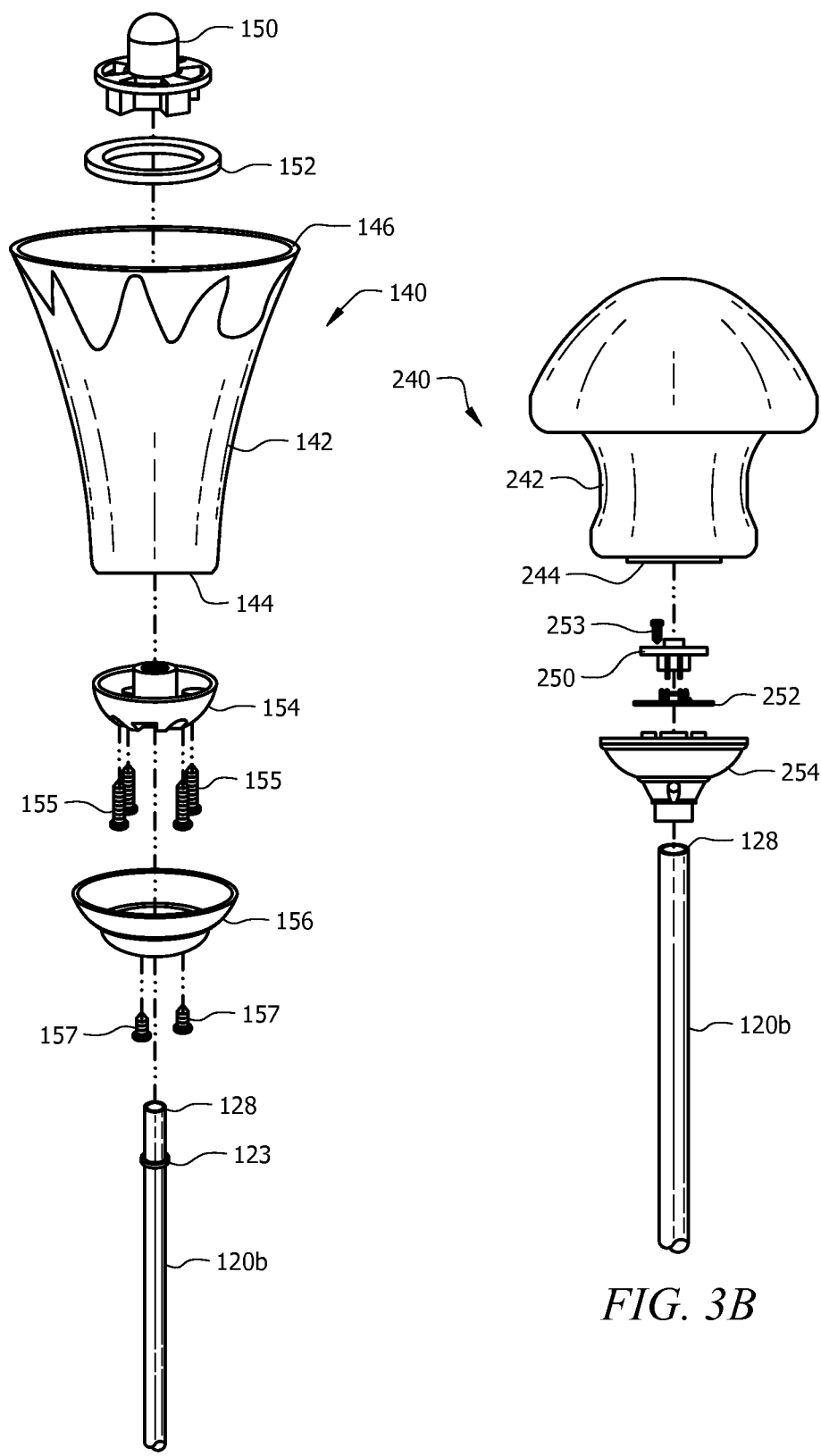
FIG. 3A is an exploded view of a the open-ended light fixture of the first embodiment of the outdoor light of the present invention.
FIG. 3B is an exploded view of a the closed-ended light fixture of the second embodiment of the outdoor light of the present invention.

The primary distinguishing characteristic between the two embodiments is the light fixture element, which may comprise either an open-ended light fixture 140 as shown in FIG. 2A or a closed-ended light fixture 240 as shown in FIG. 2B. With reference now to FIG. 3A, a close-up, exploded view of the open-ended light fixture 140 is depicted. The open-ended light fixture 140 includes an open-ended light shade 142 surrounding an LED light module 150 (comprising at least one light emitting diode), which are both attached to the upper end 128 of the upper extension shaft 120b by means of a retainer base unit 154. The open-ended light shade 142 is open at both its bottom 144 and top 146 ends. The bottom end 144 is dimensioned so as to interface with the retainer base unit 154. The retainer base unit 154 is fixably attached about the outer circumference of the distal end 128 of the upper extension shaft 120b (e.g., by adhesive means, screw fasteners, etc.). An alignment ring 123 attached to the upper end of the extension shaft 120b assists in properly positioning the retainer base unit 154 on the distal end 128 of the upper extension shaft 120b. The retainer base unit 154 is attached to the LED light module 150 by means of screw fasteners 155. A washer 152 may be configured between the retainer base unit 154 and the LED light module 150 to seal the electrical connection between the multi-panel solar array 130 and the LED light module 150. The open-ended light fixture 140 may further include an annular shroud element 156 for additional support of the retainer base unit 154 and for aesthetic purposes.

A close-up, exploded view of the closed-ended light fixture 240 is depicted in FIG. 3B. The closed-ended light fixture 240 includes a closed-ended light shade 242 surrounding an LED light module 250 comprising at least one light emitting diode. The closed-ended light shade 242 includes only one opening 244 on its bottom end. The closed-ended light shade 242 and the LED light module 250 are both attached to the upper end 128 of the upper extension shaft 120b by means of a retainer base unit 254. The bottom end 244 of the closed-ended light shade 242 is dimensioned so as to interface with the retainer base unit 254. The retainer base unit 254 is fixably attached about the outer circumference of the distal end 128 of the upper extension shaft 120b (e.g., by adhesive means, screw fasteners, etc.). A washer 252 may be configured between the retainer base unit 254 and the LED light module 250 to seal the electrical connection between the multi-panel solar array 130 and the LED light module 250.

Figure 4:
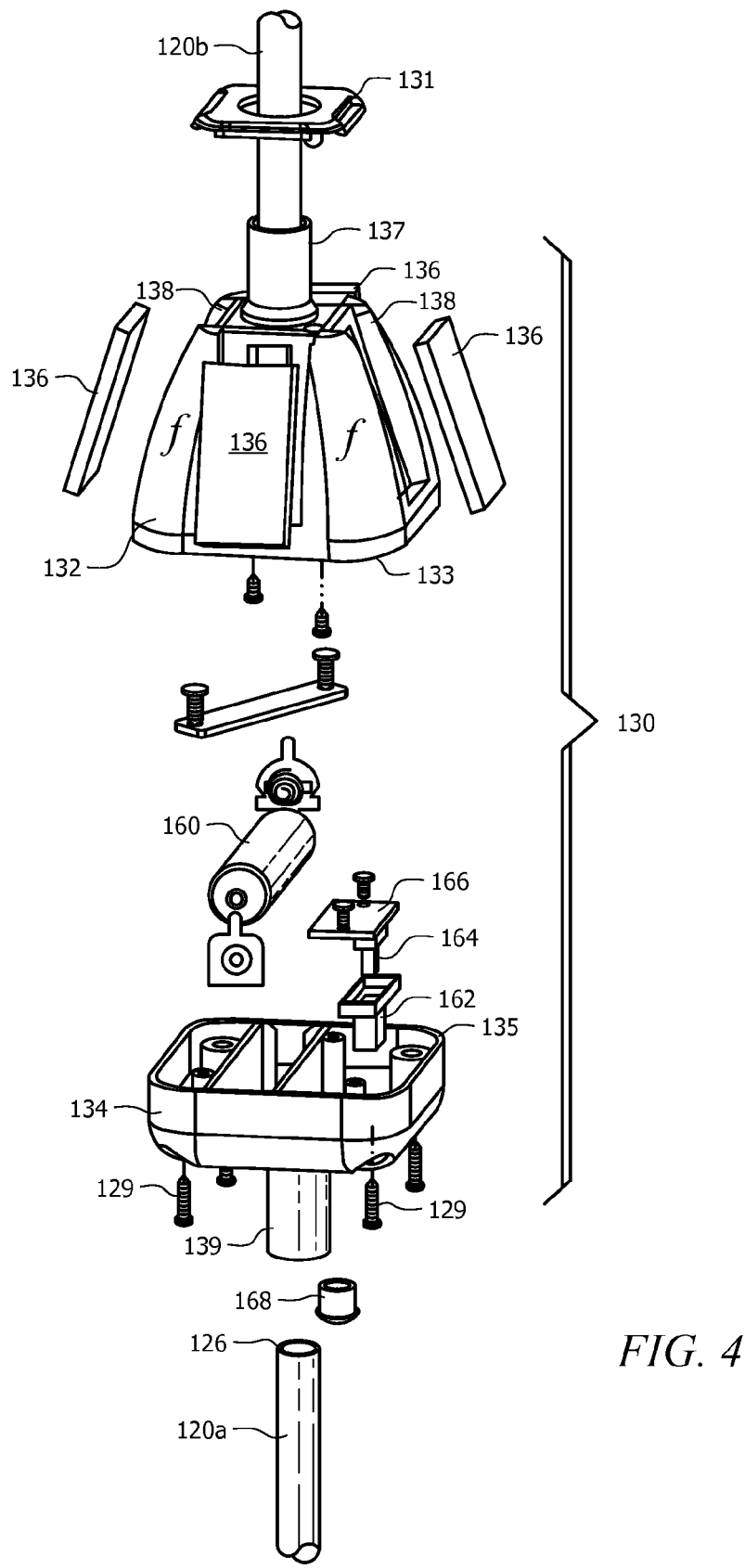
FIG. 4 is an exploded view of the embodiment of the multi-paneled solar array of the present invention shown in FIGS. 2A and 2B.

With reference now to FIG. 4, a close-up, exploded view of an embodiment of the novel multi-panel solar array 130 of the present invention is shown. The multi-panel solar array 130 includes a housing unit, which in the depicted embodiment comprises an upper or top portion 132 connected to a lower or bottom portion 134 by means of screw fasteners 129. The lower housing unit 134 includes a receiver mount 139, which is configured on the bottom of the lower housing portion 134, for coupling with the complementary distal end 126 of the lower extension shaft 120a. The upper housing unit 132 includes a receiver mount 137 configured on the top of the upper housing portion 132 of the multi-panel solar array 130, for coupling with the complementary lower end of the upper extension shaft 120b. A retainer clip 131 may be used to secure the upper housing unit 132 in place.

The primary electrical circuit components are housed in the housing unit. For example, as shown in FIG. 4, a rechargeable power storage device or battery 160 along with other componentry, such as printed circuit board 166 and switch 164, are housed in the lower housing unit 134. The electrical circuit configured in the multi-panel solar array 130 is electrically connected to the LED light module 150 by electrical conductors (e.g., wires) (not shown) between the multi-panel solar array 130 and the LED light module 150. The lower housing unit 134 may further include a weather resistant cover for the switch mechanism 164 and a translucent cover 168 to protect the light sensor switch 172 incorporated into the electrical circuit components.

The housing unit further includes a plurality of solar panels 136 arranged about the exterior of the housing unit. Each of the solar panels 136 is independent of the others, charging the battery separately and do not interfere with each other. The housing unit includes a corresponding number of complementary slots 138 formed therein for receiving the solar panels 136. For example, as shown in FIG. 4, a plurality of solar panels 136 are positioned on opposing sides of the upper housing portion 132. Preferably, each slot 138 and its respective solar panel 136 is configured at a slant or oblique angle from that of the extension shaft 120 so that when the outdoor light fixture of the present invention is properly mounted in the ground the individual solar panels are positioned at an optimal angle for maximizing exposure to ambient solar radiation. The configuration of the plurality of solar panels 136 ensures that at least one or more of the solar panels 136 is positioned to receive the maximum amount of solar energy available throughout daylight hours. While the planar surfaces of the four solar panels 136 are configured approximately 90° apart from each other are depicted, those of ordinary skill in the art will understand that other embodiments may include additional solar panels configured between the solar panels 136 as depicted. For example, additional solar panels may be further incorporated so that their planar surfaces are offset approximately 45° from the planar surfaces of the depicted solar panels 136 in additional slots formed into the corner faces f (as well as opposing corner faces (not shown)) of the upper housing portion 132 of the multi-panel solar array 130 solar depicted in FIG. 4.

Figure 5:
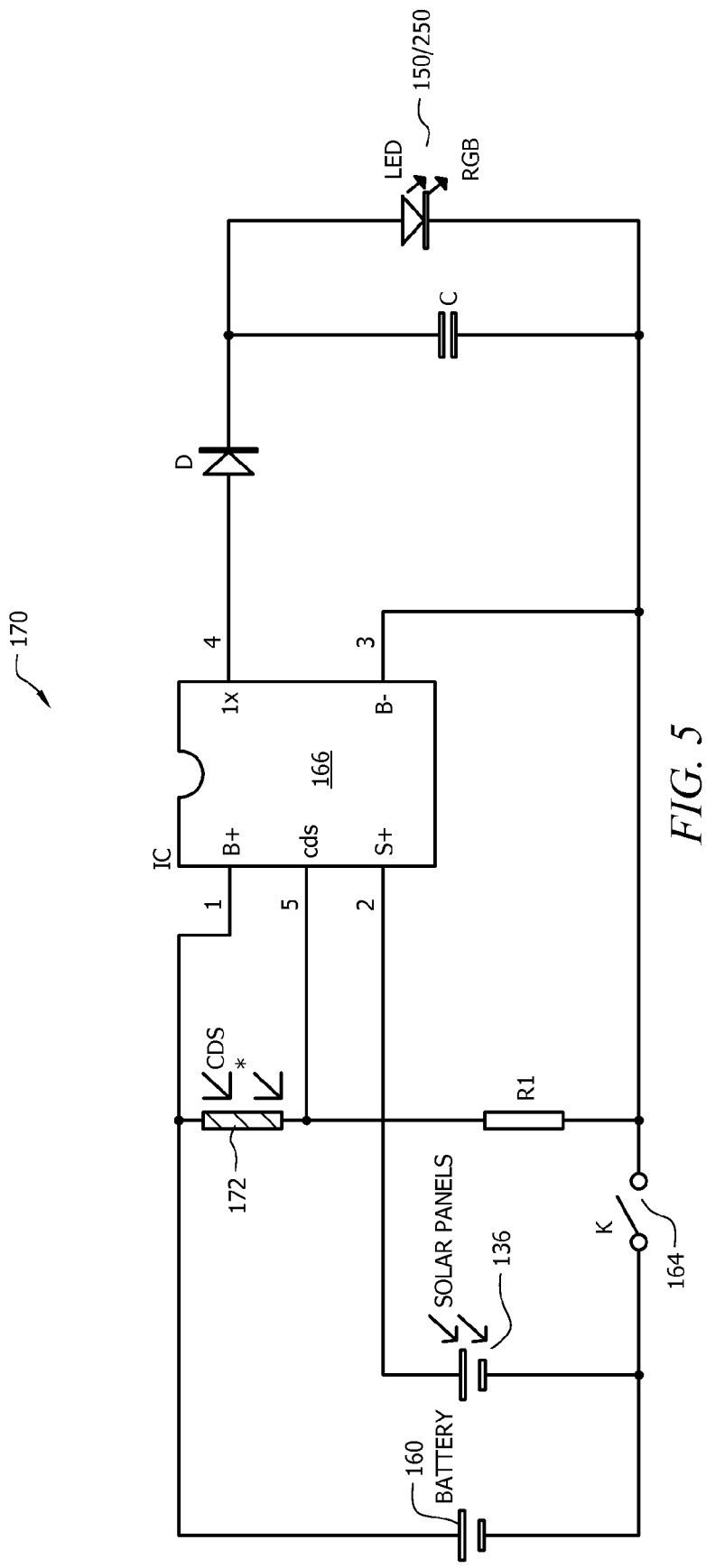
FIG. 5 is an electrical schematic diagram of an embodiment of the outdoor light of the present invention illustrating the full recommended circuit incorporating a multi-paneled solar array.

With reference now to FIG. 5, a schematic of an electrical circuit 170, constructed in accordance with the depicted embodiment of the present invention, is provided. The exemplary circuit 170 is comprised of transistors configured on a printed circuit board 166, capacitors C, resistors R, a light sensor 172, an LED light module 150/250 and a rechargeable battery 160 coupled to the multiple solar panels 136. Each of the solar panels 136 charges the battery 160 independent of the other solar panels. The rechargeable battery 160 is used to provide electrical current to and the LED light module 150/250 comprising one or more light emitting diodes.

A light sensor 172 and other circuit elements are included in the preferred embodiment to turn the LED light module 150/250 on and off when the light sensor 172 detects a certain level of light. The light sensor 172 is typically isolated from the LED light module 150/250 so that the light sensor 172 does not receive light from the LED light module 150/250. When the light sensor 172 detects a certain level of light above a predetermined threshold (for example, the light sensor 172 is exposed to sunlight), the light sensor 172 prevents the flow of electricity from the battery 160 to the LED light module 150/250. Conversely, when the light sensor 172 detects a light level below a predetermined threshold (e.g., the sensor is exposed to darkness), the light sensor 172 permits the flow of electricity from the battery 160 to the LED light module 150/250.

While the present invention has been disclosed according to its preferred and alternate embodiments, those of ordinary skill in the art will understand the other embodiments have been enabled by the foregoing description. Such other embodiments shall be included in the scope and meaning of the appended claims.

It will now be evident to those skilled in the art that there has been described herein an improved outdoor light fixture. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A solar powered outdoor light fixture comprising:
a light emitting diode (LED) module;
a multi-panel solar array housing having an upper portion and a lower portion, the housing comprising:
an upper receiver mount extending from the upper portion of the housing;
a lower receiver mount extending from the lower portion of the housing;
a plurality of solar-panel slots evenly distributed about the upper portion of the housing; and
a plurality of corner faces, each disposed between a respective adjacent pair of the solar-panel slots;
a rechargeable battery disposed within the multi-panel solar array housing;
a lower extension shaft having upper and lower ends thereof, the lower extension shaft having a ground spike on the lower end thereof,
wherein the upper end of the lower extension shaft extends into the lower receiving mount of the multi-panel solar array housing;
an upper extension shaft, coaxial with the lower extension shaft, disposed between the LED module and the multi-panel solar array housing, the upper extension shaft having upper and lower ends thereof,
wherein the lower end of the upper extension shaft extends into the upper receiving mount of the multi-panel solar array housing;
a plurality of solar panels, each disposed within a respective one of the plurality of solar-panel slots at an oblique angle relative to the upper and lower extension shafts; and
circuitry disposed within the multi-panel solar array configured for receiving electrical power from the solar panels, providing electrical power from the rechargeable battery to the LED module, and recharging the rechargeable battery using electrical power received from any one of the plurality of solar panels independently of others of the plurality of solar panels.

2. The solar powered outdoor light fixture of claim 1, further comprising a retainer base attached to the upper end of the upper extension shaft for supporting the LED module.

3. The solar powered outdoor light fixture of claim 2, further comprising an open-ended light shade supported by the retainer base.

4. The solar powered outdoor light fixture of claim 2, further comprising a closed-ended light shade supported by the retainer base.

5. The solar powered outdoor light fixture of claim 1, further comprising a light sensor arranged to sense ambient levels of light, wherein the circuitry is further configured to control the LED module based on the light sensed by the light sensor.

6. The solar powered outdoor light fixture of claim 1, wherein the upper extension shaft is hollow and the lower extension shaft is solid.

7. The solar powered outdoor light fixture of claim 5, wherein the lower extension shaft includes a stabilization spike attached thereto, wherein a portion of the stabilization spike extends parallel to the lower extension shaft.

8. The solar powered outdoor light fixture of claim 1, wherein the light sensor is positioned so as to be isolated from light emitted by the LED module.

* * * * *